(12) United States Patent
Kwon et al.

(10) Patent No.: US 9,870,805 B2
(45) Date of Patent: *Jan. 16, 2018

(54) AIR CHANNEL IN STORAGE MEDIA FOR CHASSIS THERMAL DESIGN

(71) Applicant: DELL PRODUCTS, LP, Round Rock, TX (US)

(72) Inventors: Haesung Kwon, Austin, TX (US); Eric M. Tunks, Austin, TX (US)

(73) Assignee: DELL PRODUCTS, LP, Round Rock, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/166,947

(22) Filed: May 27, 2016

(65) Prior Publication Data

US 2016/0275993 A1    Sep. 22, 2016

Related U.S. Application Data (63) Continuation of application No. 14/465,465, filed on Aug. 21, 2014, now Pat. No. 9,400,532.

(51) Int. Cl.
    *G06F 1/20*         (2006.01)
    *G06F 1/18*         (2006.01)
    *G11B 33/14*      (2006.01)

(52) U.S. Cl.
    CPC ............ *G11B 33/142* (2013.01); *G06F 1/187* (2013.01); *G06F 1/20* (2013.01)

(58) Field of Classification Search
    CPC ........... H05K 7/20145; H05K 7/20172; H05K 7/20136; H05K 7/20209; H05K 7/20727; H05K 7/20909; H05K 7/20972; H05K 7/20736; H05K 7/20836; H05K 7/20154; H05K 7/202; H05K 7/20; H05K 7/2019; H05K 7/1488; H05K 7/20563; H05K 7/20572; H05K 7/20863; H05K 1/0201; H05K 1/0203; H05K 1/181; H05K 3/368; H05K 5/0004; H05K 5/0213;
(Continued)

(56) References Cited

U.S. PATENT DOCUMENTS 5,493,457 A * 2/1996 Kawamura .......... G11B 33/142
                                                                        360/97.12
5,663,853 A      9/1997 Park
(Continued)

OTHER PUBLICATIONS

U.S. Appl. No. 14/023,939, filed Sep. 11, 2013.

*Primary Examiner* — James Wu
*Assistant Examiner* — Michael Matey
(74) *Attorney, Agent, or Firm* — Larson Newman, LLP (57) ABSTRACT

A storage device includes a first portion including drive media, and a second portion. The second portion includes a first end wall that is in physical communication with first and second side walls, and a second end wall that is in physical communication with the first and second side walls. The second portion also includes a printed circuit board mounted within the cavity, a plurality of ribs within the cavity, and an air channel within the cavity. The air channel has a lower air flow impedance than other portions of the storage device including the first portion, the printed circuit board, and the ribs. The air channel extends along a direction between the first end wall and the second end wall of the storage device.

19 Claims, 7 Drawing Sheets

(58) Field of Classification Search
CPC .. H05K 5/0217; H05K 5/0247; H05K 7/1427;
H05K 7/20618; G06F 1/20; G06F 1/181;
H01L 23/467; H01L 23/34; G02F
1/133385; G02F 2201/36
See application file for complete search history.

(56) References Cited

U.S. PATENT DOCUMENTS

| | | | | |
|---|---|---|---|---|
| 5,694,290 | A * | 12/1997 | Chang | G11B 33/025 361/679.31 |
| 6,473,297 | B1 * | 10/2002 | Behl | G06F 1/184 361/679.33 |
| 6,735,080 | B1 * | 5/2004 | Chang | G11B 33/124 361/690 |
| 6,882,528 | B2 * | 4/2005 | Chuang | G11B 33/08 312/223.1 |
| 6,947,252 | B2 | 9/2005 | Kang et al. | |
| 7,242,580 | B1 * | 7/2007 | Tanaka | G11B 33/142 136/212 |
| 7,307,843 | B2 * | 12/2007 | Harman | G11B 33/142 361/679.48 |
| 7,554,811 | B2 * | 6/2009 | Scicluna | G06F 1/184 312/223.1 |
| 7,929,303 | B1 * | 4/2011 | Merrow | G11B 33/128 324/73.1 |
| 2001/0008480 | A1 * | 7/2001 | Huang | G11B 33/124 361/679.33 |
| 2002/0051338 | A1 * | 5/2002 | Jiang | G06F 1/20 361/679.36 |
| 2004/0085722 | A1 * | 5/2004 | Tanzer | G06F 1/182 361/679.31 |
| 2004/0182800 | A1 * | 9/2004 | Poirier | G11B 33/0411 211/40 |
| 2005/0013110 | A1 * | 1/2005 | Shah | G11B 33/08 361/679.36 |
| 2005/0229198 | A1 * | 10/2005 | Christie, Jr. | G11B 17/041 720/730 |
| 2007/0014086 | A1 * | 1/2007 | Kim | G06F 1/187 361/679.36 |
| 2008/0151492 | A1 * | 6/2008 | Maddox | G06F 1/20 361/679.49 |
| 2011/0255235 | A1 * | 10/2011 | Chen | G06F 1/187 361/679.33 |
| 2012/0087038 | A1 | 4/2012 | Kwon | |
| 2012/0214041 | A1 * | 8/2012 | Harada | H01M 10/6563 429/120 |
| 2012/0314365 | A1 * | 12/2012 | Matsumoto | H01L 23/36 361/690 |
| 2013/0329354 | A1 * | 12/2013 | Knopf | G06F 1/1658 361/679.36 |
| 2016/0037687 | A1 * | 2/2016 | Stevens | G11B 33/142 361/679.31 |

* cited by examiner

AIR CHANNEL IN STORAGE MEDIA FOR CHASSIS THERMAL DESIGN

CROSS REFERENCE TO RELATED APPLICATION(S)

This application is a continuation of U.S. patent application Ser. No. 14/465,465, entitled "Air Channel in Storage Media for Chassis Thermal Design," filed on Aug. 21, 2014, the disclosure of which is hereby expressly incorporated by reference in its entirety.

FIELD OF THE DISCLOSURE

The present disclosure generally relates to an air channel in storage media for chassis thermal design.

BACKGROUND

As the value and use of information continues to increase, individuals and businesses seek additional ways to process and store information. One option is an information handling system. An information handling system generally processes, compiles, stores, or communicates information or data for business, personal, or other purposes. Technology and information handling needs and requirements can vary between different applications. Thus information handling systems can also vary regarding what information is handled, how the information is handled, how much information is processed, stored, or communicated, and how quickly and efficiently the information can be processed, stored, or communicated. The variations in information handling systems allow information handling systems to be general or configured for a specific user or specific use such as financial transaction processing, airline reservations, enterprise data storage, or global communications. In addition, information handling systems can include a variety of hardware and software resources that can be configured to process, store, and communicate information and can include one or more computer systems, graphics interface systems, data storage systems, networking systems, and mobile communication systems. Information handling systems can also implement various virtualized architectures. Data and voice communications among information handling systems may be via networks that are wired, wireless, or some combination.

Information handling systems, such as servers, can include multiple storage devices, which can be front loaded or top loaded into a server rack holding the servers. In a front loaded server rack, the direction of air flow can be across the length of front loaded storage devices.

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings, and is provided to assist in describing the teachings. This focus should not be interpreted as a limitation on the scope or applicability of the teachings.

Figure 1:
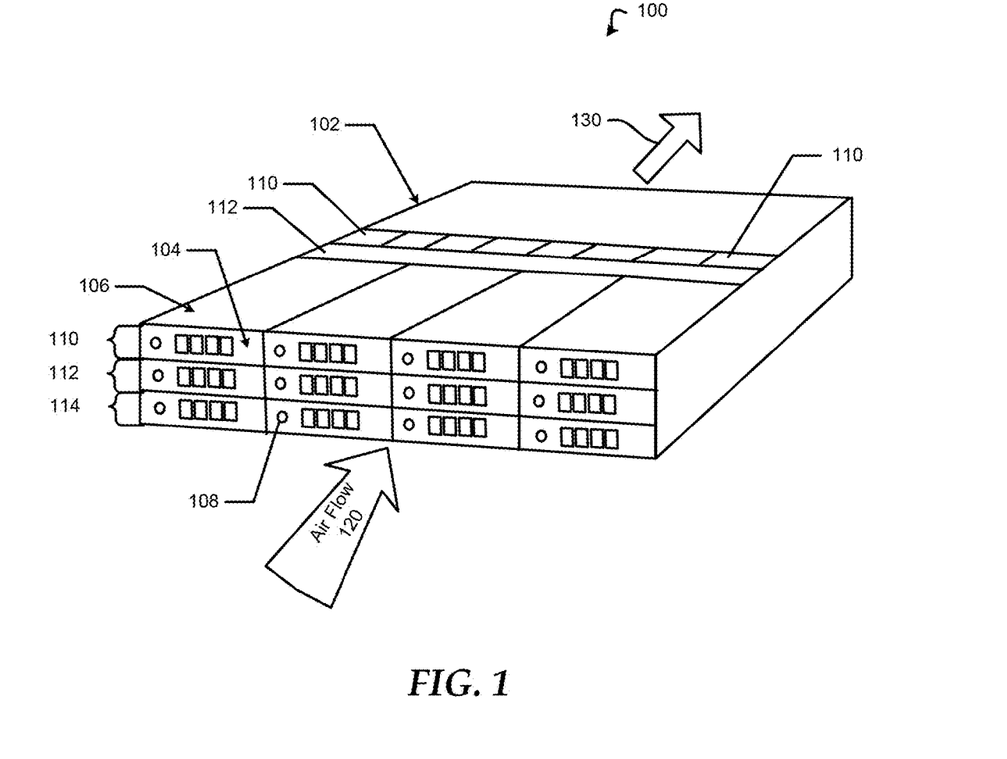
FIG. 1 is a perspective view of an information handling system.

FIG. 1 shows an information handling system 100. For purposes of this disclosure, an information handling system can include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

The information handling system 100, such as a server rack, includes a storage device drawer 102. In FIG. 1, the top of the drawer is removed to show the components located with the drawer, which includes storage device carriers 104 and storage devices 106. The storage device carriers 104 each include an opening 108 as discussed in greater detail below. As shown, the storage device drawer 102 includes multiple and parallel rows 110, 112, and 114 of closely-spaced storage devices 106 and their respective storage device carriers 104 that are oriented top-to-bottom in the drawer. The drawer 102 also includes a backplane 112 be connected with the storage devices 106, and rear-mounted cooling fans 110 that draw fresh cooling air 120 into the front drawer and expel warmed cooling air 130 from the back of the drawer. The drawer 102 is designed for front loaded insertion of the storage devices 106, such that the storage devices are inserted horizontally in the front of the drawer and connected with the backplane 112. In this embodiment, the cooling fans 110 can pull cooling air flow 120 across the storage devices 106 and the backplane 112, and out the back of the drawer. Due to the multiple top-to-bottom orientation of the rows 110, 112, and 114 of storage devices 106, the air flow of fresh cooling air 120 across the storage devices is reduced by the air flow impedance of the storage devices 106 and the storage device carriers 104.

Figure 2:
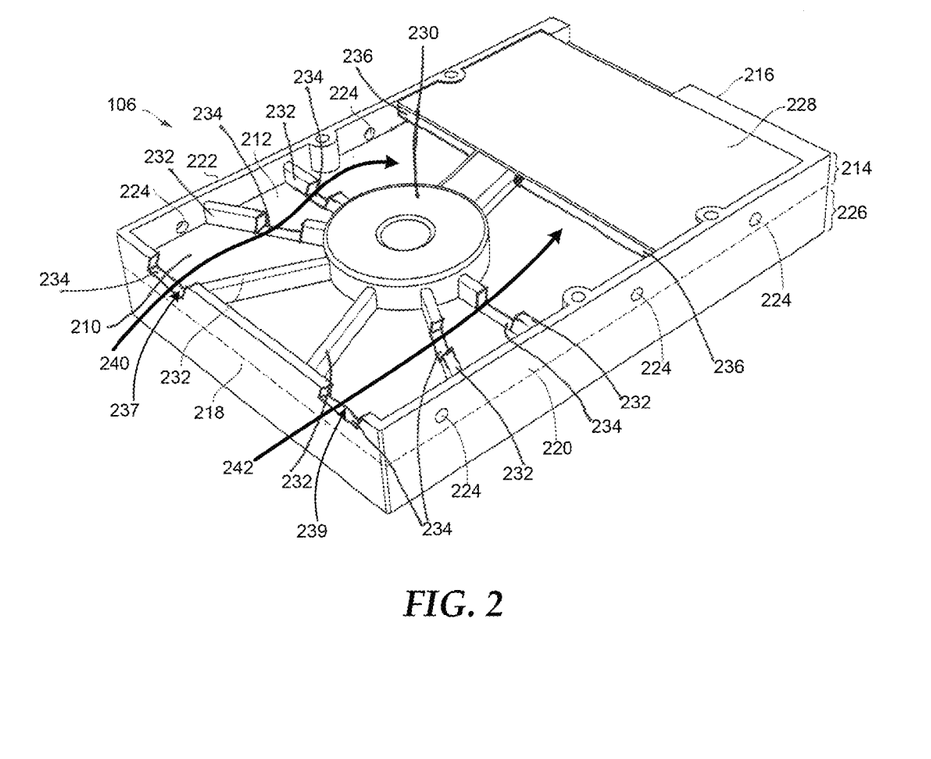
FIG. 2 is a diagram of an embodiment of a storage device of the information handling system.

FIG. 2 shows a bottom perspective view of storage device 106, which includes a cavity 210 that is defined in a bottom surface 212 of a base portion 214 of the casting of the storage device 106. Not shown is the opposing top surface of storage device 106 that may in one embodiment be a substantially flat and solid surface, such that no cavity is defined therein. As shown, storage device 106 has a front wall 216, a back wall 218, and two opposing side walls 220 and 222. In an embodiment, the storage device 106 may have a lateral dimension of about 3.5 inches wide measured between side walls 220 and 222, and a longitudinal dimension of about 6 inches long measured between front wall 216 and back wall 218, although it is possible that the storage device may have a form factor of any other size or shape, such as larger or smaller.

The storage device 106 further includes threaded mounting holes 224 that are defined in the opposing side walls 220 and 222 of storage device 106 to receive complementary threaded fasteners that serve the purpose of securing the storage device carrier 104 to the storage device 106 as further described herein. The storage device 106 also includes a top portion 226, which in turn is a sealed space that contains the drive media and read/write arm. The base portion 214 of the storage device 106, which is delineated from top section 226 by dashed lines, generally consists of a drive controller printed circuit board (PCB) 228, a motor housing 230, and has protrusions/ribs 232 for bearings and stiffening features of the storage device 106. The storage device 106 also includes a gasket 236 located in between the bottom surface 212 and the PCB 228. In an embodiment, the gasket 236 can reduce noise produced during the normal operations of the storage device 106, such as read/write operations. The gasket 236 can also reduce vibrations passed to the PCB 228 during the operation of the storage device.

The base portion 214 is configured to perform multiple roles for the storage device 106, including providing shock/rotational vibration (RV)/dynamics dampening, thermal dissipation, air flow, and head/disk interface (HDI) stability. In an embodiment, the ribs 232 are not sized to be the full height of the casting of the storage device 106, such that they do not extend to the match the full height of the side walls 220 and 222 of base portion 214. In this regard, the height of ribs 232 is reduced relative to the side walls 220 and 222 to increase longitudinal (front-to-back) air flow when storage device 106 is deployed in front loaded drawer 102 of FIG. 1.

However, even with the reduced height of the ribs 232, the back wall 218, the ribs, the gasket 236, and PCB 228 can continue to cause a high air flow impedance for the air flowing longitudinally across the storage device 106, such that the cooling of the storage device is not optimized. The air flow impedance can be the defined as an air flow pressure over air flow. For example, a higher air flow impedance can result in a higher air flow pressure to move the same amount of air than a lower air flow impedance. The back wall 218 and the ribs 232 include a cutout portion 234. In an embodiment, not every rib 232 includes a cutout portion 234. However, in another embodiment, each and every rib 232 in the storage device 106 can include a cutout portion 234.

In an embodiment, the back wall 218 can include two cutout portions 234, which in turn can be aligned with cutout portions of different ribs 232. In this situation, the first cutout portion 234 in the back wall 218 can be located near the side wall 222 and can align with cutout portions 234 in ribs 232 extended from the side wall 222 to the motor housing 230 to create a first air channel 237 in the storage device 106. The first air channel 237 can decrease the air flow impedance of the storage device 106, as shown in FIG. 3, and thereby increase air flow 240 within the first air channel 237 of the storage device and increase the cooling of the storage device as compared to the storage device without the first air channel 237.

In an embodiment, the storage device 106 can also include a second cutout 234 in the back wall 218, which is located near the side wall 220. In this embodiment, the second cutout 234 is aligned with cutout portions 234 of the ribs extending from the side wall 220 to the motor housing 230 to create a second air channel 239 in the storage device 106. The second air channel 239 can further decrease the air flow impedance of the storage device 106, and thereby increase air flow 242 within the second air channel of the storage device and increase the cooling of the storage device as compared to the storage device without the second air channel 239.

Figure 3:
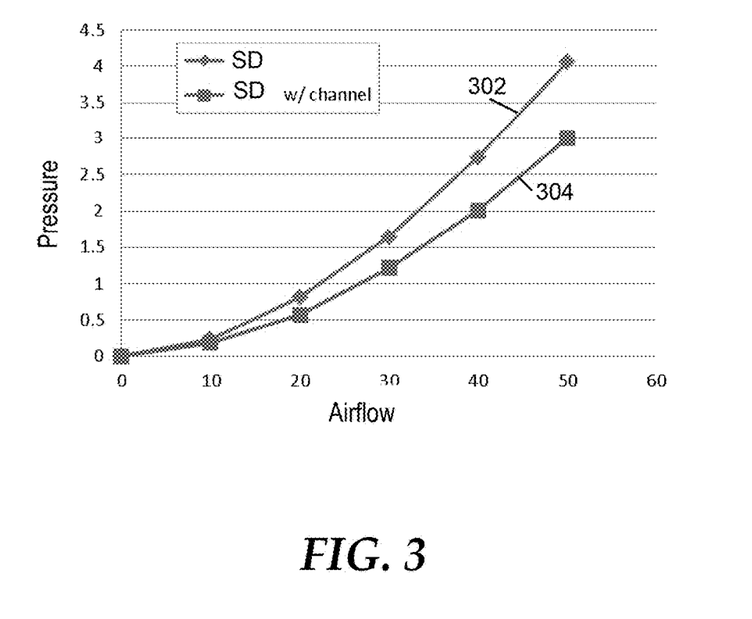
FIG. 3 is a graph showing an air flow impedance curve of a storage device compared to an air flow impedance curve of the storage device of FIG. 2.

FIG. 3 shows a graph of an air flow impedance curve 302 of a storage device compared to an air flow impedance curve 304 of the storage device 106 of FIG. 2. As shown in FIG. 3, the air channels 237 and 239 formed via the cutout portions 234 in the back wall 218 and ribs 232 reduces the air flow impedance of the storage device 106 as compared to a storage device without the cutout portions. For example, as shown by the air flow impedance curve 302 and the air flow impedance curve 304 the amount of air pressure that is created to move 50 cubic feet per minute (CFM) of air across the storage device 106 of FIG. 2 is more than 1 pound per square inch (PSI) less than the same storage device without the air channels 237 and 239. Therefore, the cooling fans 110 do not have to run as fast, and thereby use less power, to move the same amount of air across the storage device of FIG. 2 than the same storage device without the air channels 237 and 239.

Figure 4:
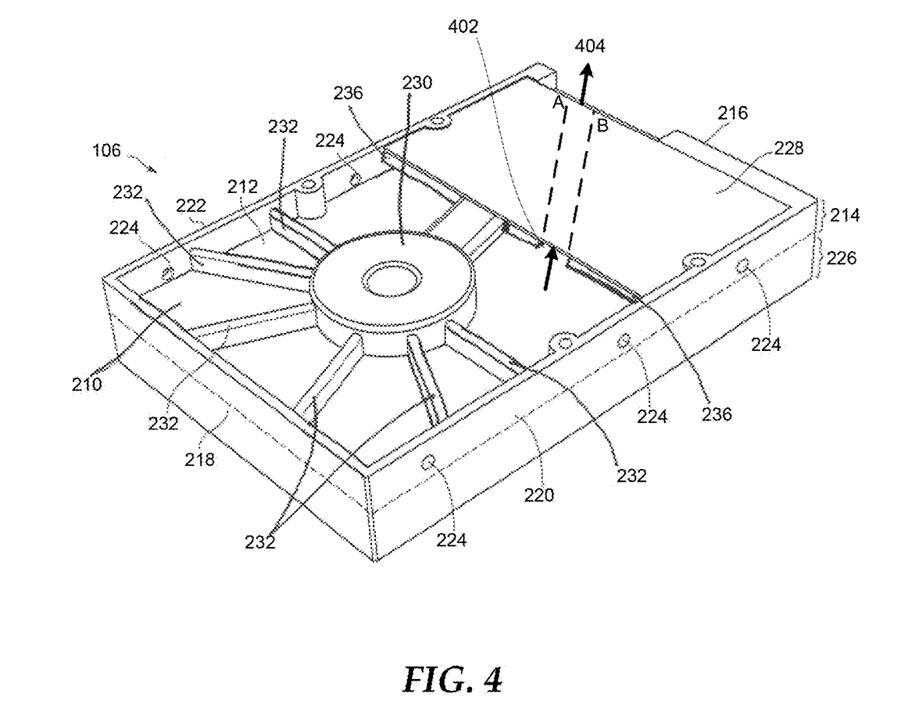
FIG. 4 is a diagram of another embodiment of the storage device.

FIG. 4 shows a bottom perspective view of another embodiment of the storage device 106, which includes the cavity 210 defined by the surface 212, the front wall 216, the back wall 218, and the side walls 220 and 222 of the bottom portion 214. The motor housing 230 and the ribs 232 of the storage device 106 can be formed by the casting of the bottom portion 214 as described above. In this embodiment, the back wall 218 and ribs 232 can be formed without the cutout portions 234 of FIG. 2. The storage device 106 also includes the top portion 226 that is in physical communication with the bottom portion 214. The PCB 228 can extend along the front wall 216 from the side wall 222 to the side 220 and the gasket 236 is included in between the PCB and the surface 212 of the storage device 106. The storage device 106 further includes the threaded mounting holes 224 that are in the side walls 220 and 222. In an embodiment, the storage device 106 can be a solid state device, such that the top portion 226 is a sealed space that contains drive media without the read/write arm. Thus, in an embodiment, the base portion 214 can include the front wall 216, the back wall 218, the side walls 220 and 222, surface 212, PCB 228, and gasket 236, such that the base portion can be formed without the cavity 210, motor housing 230, or ribs 232.

In an embodiment, the gasket 236 can include an air channel 402. In this embodiment, the gasket 236 is cut along both line A and line B to create the air channel 402 defined by the two portions of the gasket, the surface 212, and the PCB 228. The air channel 402 can decrease the air flow impedance of the storage device 106, and thereby increase air flow 304 within the air channel of the storage device and increase the cooling of the storage device as compared to the storage device without the air channel 402. In another embodiment, the gasket 236 can have a high porosity. In this situation, the gasket 236 can include larger holes within the gasket as compared to a typical gasket, which can also decrease the air flow resistance of the gasket and thereby increase air flow in the storage device 106.

Figure 5:
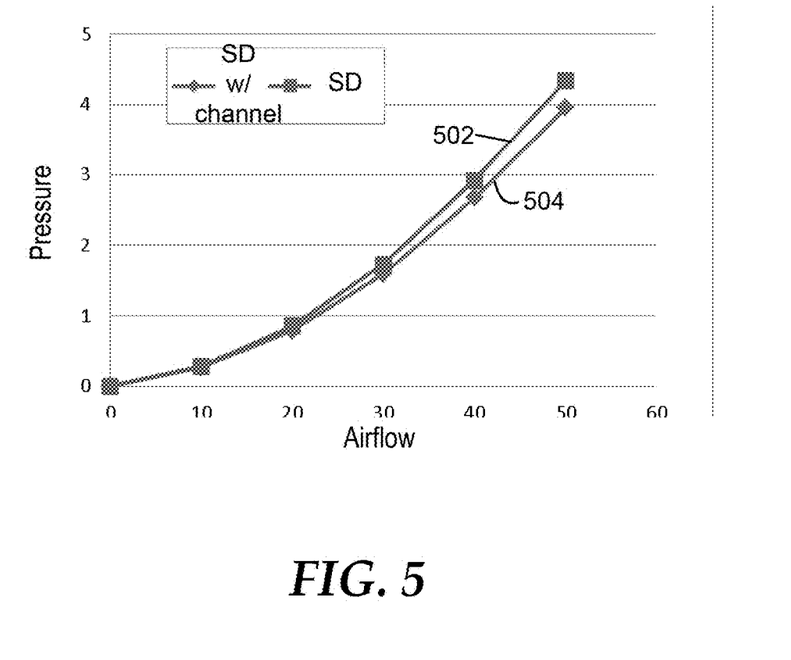
FIG. 5 is a graph showing an air flow impedance curve of a storage device compared to an air flow impedance curve of the storage device of FIG. 4.

FIG. 5 shows a graph of an air flow impedance curve 502 of a storage device compared to an air flow impedance curve 504 of the storage device 106 show in FIG. 4. As shown in FIG. 5, the air channel 402 reduces the air flow impedance of the storage device 106 as compared to a storage device without the cutout portions. For example, as shown by the air flow impedance curves 502 and 504 the amount of air pressure that is created to move 50 CFM of air across the storage device 106 of FIG. 4 is more than a quarter of a PSI less than the same storage device without the air channel 402. Therefore, the cooling fans 110 do not have to run as fast, and thereby use less power, to move the same amount of air across the storage device of FIG. 4 than the same storage device without the air channel 402.

Figure 6:
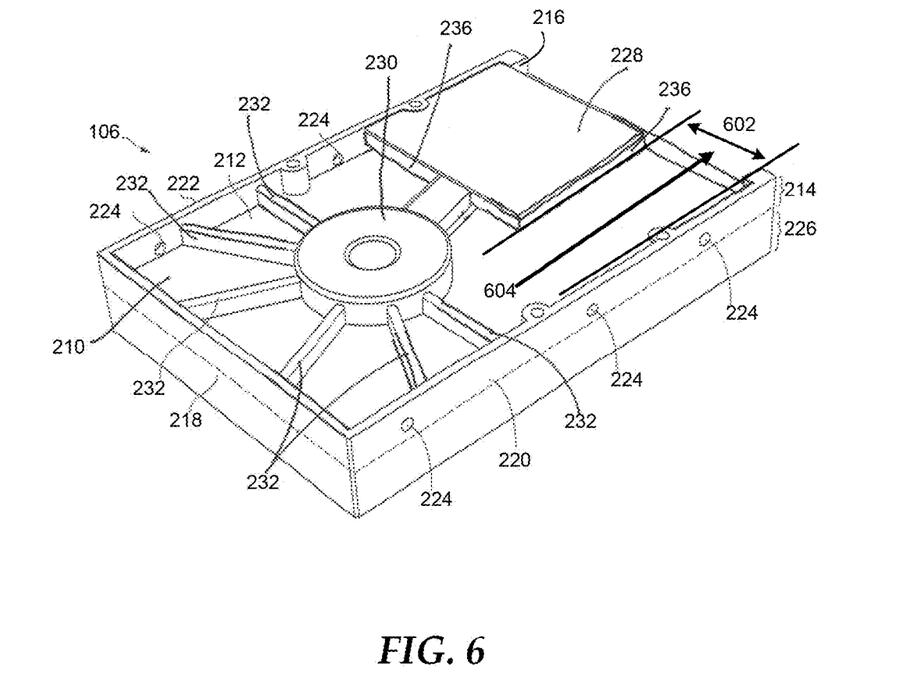
FIG. 6 is a diagram of another embodiment of the storage device.

FIG. 6 shows a bottom perspective view of another embodiment of the storage device 106, which includes the cavity 210 defined by the surface 212, the front wall 216, the back wall 218, and the side walls 220 and 222 of the bottom portion 214. The motor housing 230 and the ribs 232 of the storage device 106 can be form by casting of the bottom portion 214 as described above. In this embodiment, the back wall 218 and ribs 232 can be formed without the cutout portions 234 of FIG. 2. The storage device 106 also includes the top portion 226 that is in physical communication with the bottom portion 214. The storage device 106 further includes threaded mounting holes 224 in the side walls 220 and 222. The gasket 236 is included in between the PCB 228 and the surface 212 of the storage device 106.

In this embodiment, the PCB 228 can extend along the front wall 216 from the side wall 222 toward the side wall 220 but not extend all the way to the side wall 220. The front 216, from the end of the PCB 228 to the side wall 220, can have the same height as the surface 212 of the bottom portion 214. The space left between the end of the PCB 228 and the side wall 220 can create an air channel 602, which can decrease the air flow impedance of the storage device 106. The decrease air flow impedance create by the air channel 602 can increase air flow 604 across the storage device and increase the cooling of the storage device as compared to the storage device without the air channel.

Figure 7:
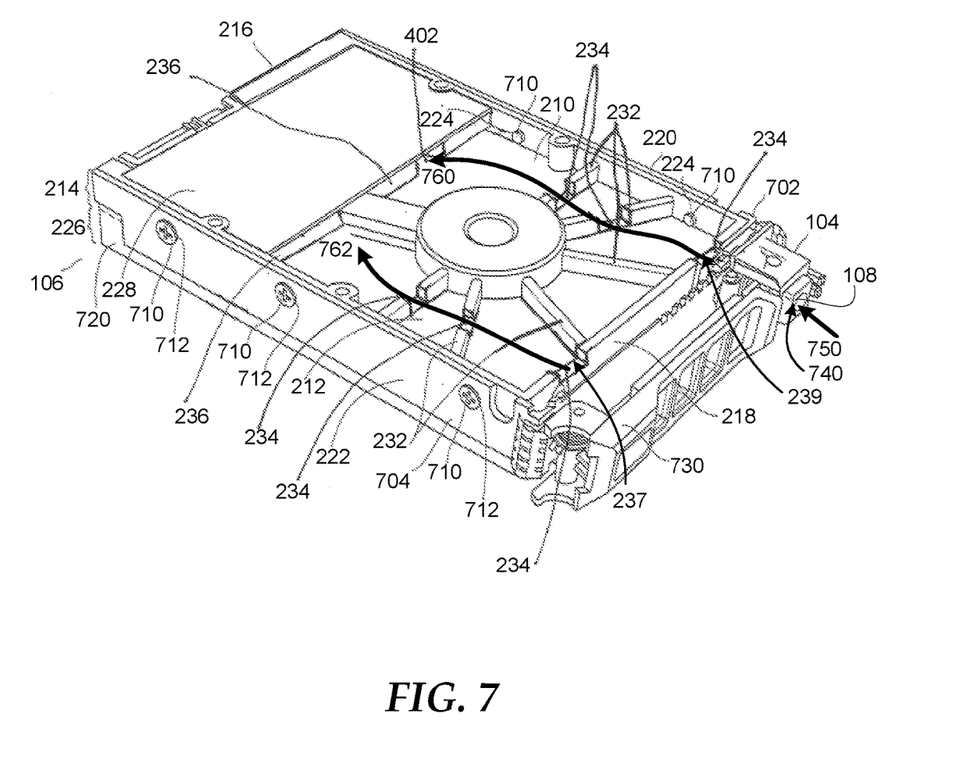
FIG. 7 is a diagram of an embodiment of the storage device with a carrier of the information handling system.

FIG. 7 shows the storage device 106 as it may be mechanically coupled to two side components 702 and 704 of the storage device carrier 104 by threaded mounting screws 710 received through mounting holes 712 of storage device carrier 106 into threaded mounting holes 224 of storage device 106 to form a conventional mountable hard drive system. As shown, side mounting rails 702 and 704 of storage device carrier 104 are configured to slide along a contiguous rail surface 720 of side walls 220 and 222 of storage device 106 between the fastener holes 224. As further shown in FIG. 7, drive carrier side components 702 and 704 are configured to support a cross member in the form of a drive handle mechanism 730 there between that allows for insertion and removal of the storage device 106 from mating relationship with a corresponding mechanism within the drawer 102 of FIG. 1.

The storage device 106 includes the cavity 210 defined by the surface 212, the front wall 216, the back wall 218, and the side walls 220 and 222 of the bottom portion 214. The ribs 232 of the storage device 106 can be form by casting of the bottom portion 214 as described above. The storage device 106 also includes the top portion 226 that is in physical communication with the bottom portion 214. In this embodiment, the back wall 218 and ribs 232 can be formed with the cutout portions 234 of FIG. 2, and the gasket 236 includes the air channel 402 as described in FIG. 4. Thus, depending on the embodiment, the storage device 106 can include in combination of air channels 237, 239, 402, and 602 as described above to decrease the air flow impedance of the storage device.

As shown in FIG. 7, the storage device carrier 104 can include the opening 108 to create an air channel 740 through the storage device carrier. The air channel 740 can decrease the air flow impedance of the storage device carrier 104. In an embodiment, the air channel 740 can align with the air channel 239 of the storage device to allow cooling air flow 750 to move through the storage device carrier 104, across the storage device, and through air channel 402 as air flow 760. Additionally, the air channel 237 can provide cooling air flow 762 across the storage device 106 to further decrease the air flow impedance and thereby increase the cooling of the storage device. In another embodiment, the backplane 112 of FIG. 1 can also include an air channel that can align with the air channels of the storage device carrier 104 and the storage device 106 to decrease the overall air flow impedance of the information handling system 100.

Although only a few exemplary embodiments have been described in detail herein, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents, but also equivalent structures.

The above-disclosed subject matter is to be considered illustrative, and not restrictive, and the appended claims are intended to cover any and all such modifications, enhancements, and other embodiments that fall within the scope of the present invention. Thus, to the maximum extent allowed by law, the scope of the present invention is to be determined by the broadest permissible interpretation of the following claims and their equivalents, and shall not be restricted or limited by the foregoing detailed description.

What is claimed is:

1. A storage device comprising:
   a first portion including drive media; and
   a second portion in physical communication with the first portion, the second portion including:
   a first end wall that is in physical communication with first and second side walls;
   a second end wall that is in physical communication with the first and second side walls, wherein the physical communication between the first and second end walls and the first and second side walls form a cavity in the second portion;
   an air channel within the second portion, wherein the air channel has a lower air flow impedance than other portions of the storage device including the first portion, and other parts of the second portion other than the air channel; and a plurality of ribs within the cavity, wherein the air channel is formed via a cutout portion in the second end wall being aligned with a cutout portion in a subset of the ribs.

2. The storage device of claim 1, further comprising:
a printed circuit board in physical communication with the second end wall and the first side wall, wherein the printed circuit board extends from the first side wall toward the second side wall, wherein an end of the printed circuit board that is opposite of the first wall ends a predetermined distance from the second side wall, and the air channel is defined by the predetermined distance between the printed circuit board and the second side wall.

3. The storage device of claim 2, wherein the second portion further includes:
a gasket in physical communication between a surface of the second portion and the printed circuit board, wherein the air channel extends within the gasket and in between the printed circuit board and the surface of the second portion.

4. The storage device of claim 3, wherein the gasket has a high porosity to enable air flow of the storage device to flow through the gasket.

5. The storage device of claim 1, wherein the storage device is configured to be inserted into a front of an information handling system.

6. An information handling system comprising:
a storage device carrier configured to be inserted within a chassis of the information handling system, the storage device carrier including:
a front panel having a first surface and a second surface; and
a first air channel extending from the first surface to the second surface; and
a storage device configured to be placed in physical communication with the storage device carrier, the storage device including:
a first portion including drive media; and
a second portion in physical communication with the first portion, the second portion including:
a first end wall that is in physical communication with first and second side walls; and
a second end wall that is in physical communication with the first and second side walls, wherein the first and second end walls and the first and second side walls form a cavity in the second portion; and
a second air channel within the cavity, wherein the second air channel has a lower air flow impedance than other portions of the storage device including the first portion, and other parts of the second portion other than the second air channel.

7. The information handling system of claim 6, wherein the second portion further includes:
a plurality of ribs within the cavity, wherein the second air channel is formed via a cutout portion in the second end wall being aligned with a cutout portion in a subset of the plurality of ribs.

8. The information handling system of claim 6, further comprising:
a printed circuit board is in physical communication with the second end wall and the first side wall, wherein the printed circuit board extends from the first side wall toward the second side wall, wherein an end of the printed circuit board that is opposite of the first wall ends a predetermined distance from the second side wall, and the second air channel is defined by the predetermined distance between the printed circuit board and the second side wall.

9. The information handling system of claim 8, wherein second portion further includes:
a gasket in physical communication between a surface of the second portion and the printed circuit board, wherein the second air channel extends within the gasket and in between the printed circuit board and the surface of the second portion.

10. The information handling system of claim 9, wherein the gasket has a high porosity to enable air flow of the storage device to flow through the gasket.

11. The information handling system of claim 6, wherein the air channel extends along a direction between the first end wall and the second end wall of the storage device.

12. The information handling system of claim 6, wherein the storage device carrier and the storage device are configured to be inserted into a front of the information handling system.

13. An information handling system comprising:
a cooling fan to draw air through the information handling system;
a storage device carrier configured to be inserted within a chassis of the information handling system, the storage device carrier including:
a front panel having a first surface and a second surface; and
a first air channel extending from the first surface to the second surface; and
a storage device configured to be placed in physical communication with the storage device carrier, the storage device including:
a first portion including drive media; and
a second portion in physical communication with the first portion, the second portion including:
a first end wall that is in physical communication with first and second side walls; and
a second end wall that is in physical communication with the first and second side walls, wherein the physical communication between the first and second end walls and the first and second side walls form a cavity in the second portion.

14. The information handling system of claim 13, further comprising:
a plurality of ribs within the cavity; and
a second air channel within the cavity, wherein the first and second air channels have lower air flow impedance than other portions of the storage device carrier and the storage device including the front panel, the first portion, and the ribs, wherein the second air channel extends along a direction between the first end wall and the second end wall of the storage device, wherein the cooling fan draws the air through the first and second air channels.

15. The information handling system of claim 14, wherein the second air channel is formed via a cutout portion in the second end wall being aligned with a cutout portion in a subset of the plurality of ribs.

16. The information handling system of claim 13, further comprising:
a printed circuit board is in physical communication with the second end wall and the first side wall, wherein the printed circuit board extends from the first side wall toward the second side wall, wherein an end of the printed circuit board that is opposite of the first wall ends a predetermined distance from the second side wall, and the second air channel is defined by the predetermined distance between the printed circuit board and the second side wall.

17. The information handling system of claim 16, wherein second portion further includes:
- a gasket in physical communication between a surface of the second portion and the printed circuit board, wherein the second air channel extends within the gasket and in between the printed circuit board and the surface of the second portion.

18. The information handling system of claim 17, wherein the gasket has a high porosity to enable air flow of the storage device to flow through the gasket.

19. The information handling system of claim 13, wherein the storage device carrier and the storage device are configured to inserted into a front of the information handling system.

* * * * *